United States Patent
Furihata

(10) Patent No.: US 9,013,582 B2
(45) Date of Patent: Apr. 21, 2015

(54) TELEVISION CAMERA DEVICE

(75) Inventor: Koji Furihata, Kagamai (JP)

(73) Assignee: Hitachi Kokusai Electric Inc., Tokyo (JP)

(*) Notice: Subject to any disclaimer, the term of this patent is extended or adjusted under 35 U.S.C. 154(b) by 0 days.

(21) Appl. No.: 14/356,919

(22) PCT Filed: Sep. 12, 2012

(86) PCT No.: PCT/JP2012/073329
§ 371 (c)(1),
(2), (4) Date: Jun. 26, 2014

(87) PCT Pub. No.: WO2013/069369
PCT Pub. Date: May 16, 2013

(65) Prior Publication Data
US 2014/0320671 A1 Oct. 30, 2014

(30) Foreign Application Priority Data
Nov. 10, 2011 (JP) .................................. 2011-246020

(51) Int. Cl.
H04N 5/225 (2006.01)
H04N 5/222 (2006.01)
H04N 17/00 (2006.01)
H04N 5/262 (2006.01)
H04N 5/232 (2006.01)

(52) U.S. Cl.
CPC ............. *H04N 17/002* (2013.01); *H04N 5/262* (2013.01); *H04N 5/23241* (2013.01)

(58) Field of Classification Search
None
See application file for complete search history.

(56) References Cited

U.S. PATENT DOCUMENTS

| 4,300,168 | A | * | 11/1981 | Kawamura | .................... | 348/372 |
| 6,118,473 | A | * | 9/2000 | Tsunezune et al. | ......... | 348/14.12 |
| 2009/0102965 | A1 | * | 4/2009 | Ogawa | ........................... | 348/372 |

FOREIGN PATENT DOCUMENTS

| JP | 2001-109053 A | | 4/2001 |
| JP | 2002033950 | * | 1/2002 |
| JP | 2002-300462 A | | 10/2002 |
| JP | 2005-258034 A | | 9/2005 |
| JP | 2006319829 A | * | 11/2006 |
| JP | 2009-010635 A | | 1/2009 |
| JP | 2012-060457 A | | 3/2012 |

OTHER PUBLICATIONS

International Search Report (English and Japanese) for PCT/JP2012/073329, mailed Oct. 9, 2012.

* cited by examiner

*Primary Examiner* — Jefferey Harold
*Assistant Examiner* — Michael Teitelbaum
(74) *Attorney, Agent, or Firm* — Harness, Dickey & Pierce, P.L.C.

(57) ABSTRACT

The present invention displays the light transmission/reception level, the usable amount of remaining power of a utility, or the like, and by means of viewing the display, a user becomes able to easily make a determination, thus increasing the operability of a television camera device. The television camera device has: a camera head; a camera control unit that controls the camera head; and a cable that connects the camera head and the camera control unit. The camera head is provided with: a means for outputting a utility power source; a return video output means; and a prompt output means. The camera control unit is provided with a detection means that detects the power used by the television camera device. The camera head is provided with an output means that displays the power that the utility power source can output and the power detected by the detection means.

2 Claims, 6 Drawing Sheets

TELEVISION CAMERA DEVICE

CROSS-REFERENCE TO RELATED APPLICATIONS

This application is a 371 U.S. National Stage of International Application No. PCT/JP2012/073329, filed Sep. 12, 2012. This application claims priority to Japanese Patent Application No. 2011-246020, filed Nov. 10, 2011. The disclosures of the above applications are incorporated herein by reference.

TECHNICAL FIELD

The present invention relates to a television camera device, and in particular, relates to a television camera device that displays the operation state in order to improve the operability of the television camera device.

BACKGROUND ART

Conventionally, the transmission and/or reception of light are displayed in the front face of a housing of a camera control unit (CCU). However, the camera control unit is usually housed in a rack together with a server and the like and is installed. In the case where the camera control unit is housed in a rack, a user cannot see the front face of the housing of the camera control unit.

Accordingly, during operation, even if a problem occurs in a cable for transmission and/or reception of light and causes abnormal transmission and/or reception of light, it is difficult to confirm this state immediately.

Moreover, on the camera head side, an electric power is output for a utility. A user cannot easily check the remaining amount of the electric power available for the utility.

CITATION LIST

Patent Literature

PATENT LITERATURE 1: JP-A-2009-10635

SUMMARY OF INVENTION

Technical Problem

Patent Literature 1 discloses a remote monitoring controller, which displays as a video a delay profile waveform of a radio wave digitally modulated by a video signal on the screen of a personal computer in order to alleviate the necessity for the learning level of an operator who controls the direction of a rotating receiving antenna, wherein in an FPU (Field Pickup Unit) reception base station, microwaves transmitted from a transmission station side is received by adjusting the direction of the rotating receiving antenna by operating the personal computer. However, the display of a utility on the camera head side and/or the display of other functions have not conventionally been achieved for the purpose of improving the operability in a television camera device.

A television camera device of the present invention is intended to improve the operability of the television camera device by displaying the transmission and/or reception levels of light, the available remaining electric power of a utility, and the like and allowing a user to view the same and thereby easily determine the same. Furthermore, the electric power to be used is limited in accordance with the remaining amount of the utility electric power in order to effectively use the utility electric power that is a finite energy resource.

Solution to Problem

In order to achieve the above-described purpose, the television camera device of the present invention includes: a detection unit configured to detect the transmission and/or reception of light; a current detection unit configured to constantly detect an electric power when a utility is used; and a display unit configured to display the states thereof, and is intended to improve the operability of a user by using these units.

In order to achieve the above-described purpose, according to a first aspect of the present invention, a television camera device includes: a camera head; a camera control unit configured to control the camera head; and a cable connecting the camera control unit and the camera head, wherein the camera head includes a unit configured to output a utility power source, a return video output unit, and a prompt output unit, wherein the camera control unit includes a detection unit configured to detect the electric power used by the television camera device, and wherein the camera head includes an output unit configured to display the electric power detected by the detection unit and an electric power which the utility power source can output.

According to a second aspect of the present invention, there is provided the television camera device according to the first aspect of the present invention, wherein an order of priority is assigned to a device to which the utility power source is output, wherein the camera control unit compares a value detected by the detection unit with a predetermined value, and wherein when the detected value is equal to or greater than the predetermined value, the camera control unit restricts, based on the order of priority, a function of the device that uses an output of the utility power source of the camera head.

According to a third aspect of the present invention, there is provided the television camera device according to the first aspect of the present invention, wherein the camera control unit displays an amount of usage of electric power of the utility power source of the camera head by using the value detected by the detection unit.

Advantageous Effects of Invention

According to the present invention, the transmission and/or reception levels of light, an available remaining electric power of a utility, and the like are displayed to allow a user to view the same and thereby easily determine the same, and therefore the operability of the television camera device will improve.

Furthermore, in order to effectively use a utility electric power, a device to be connected to the utility electric power is controlled to restrict the function of this device. As a result, an electric power to be used can be limited in accordance with the remaining amount or used amount of the utility electric power.

DESCRIPTION OF EMBODIMENTS

Figure 1:
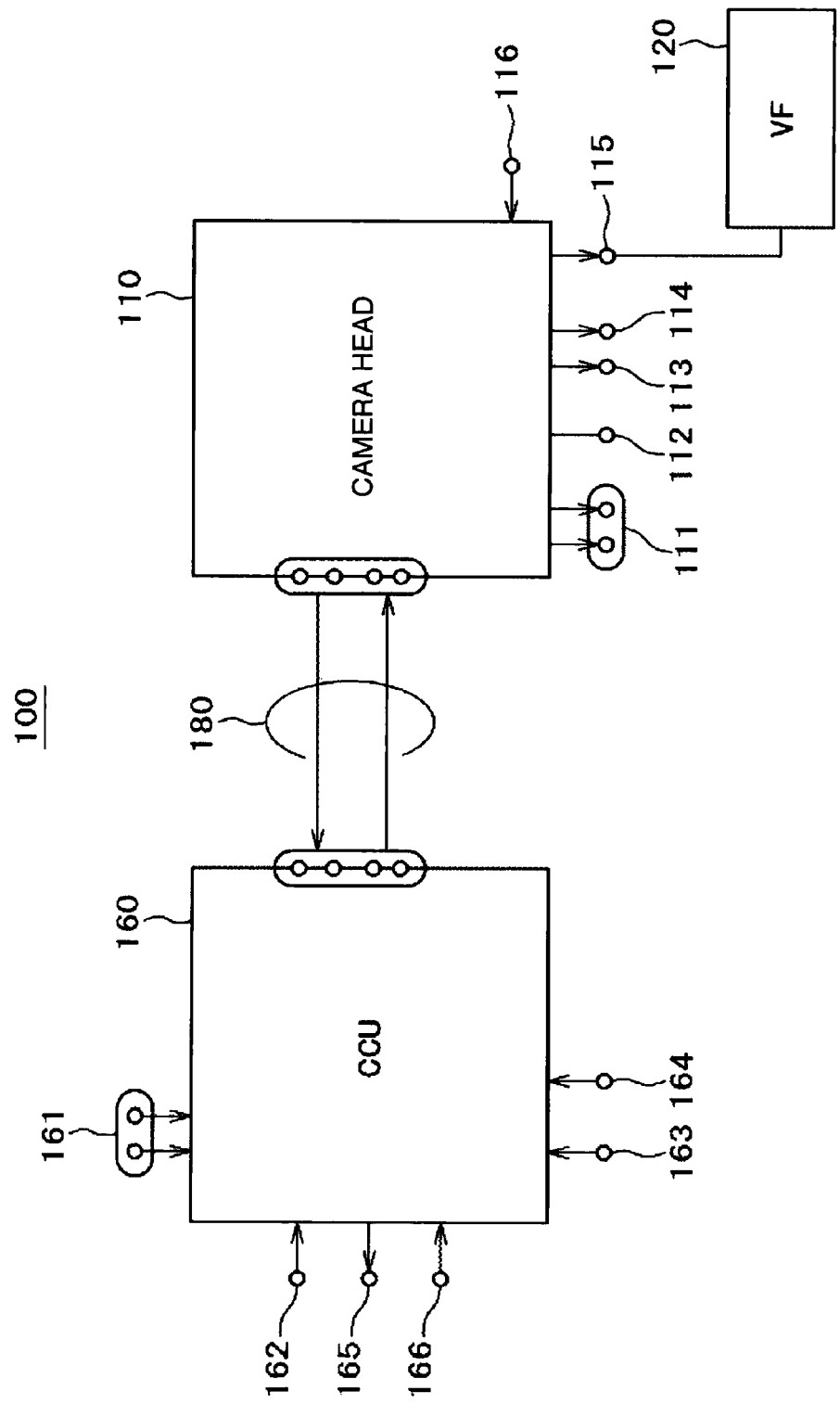
FIG. 1 is a block diagram illustrating the configuration of one example of a television camera device of the present invention.

Hereinafter, one embodiment of the present invention will be described using the accompanying drawings and the like. Note that the following description is for illustrating one embodiment of the present invention, and shall not be construed to limit the scope of the present invention. Accordingly, those skilled in the art could employ embodiments in which each or all of the above-described elements are replaced with the equivalents thereto, and therefore these embodiments are also included in the scope of the present invention.

Moreover, in the illustration of each view, a constituent element with the same function is attached with the same reference numeral to avoid the duplication and omit the description thereof as much as possible.

First Embodiment

A first embodiment of a television camera device of the present invention is illustrated using FIG. 1 to FIG. 8.

FIG. 1 is a block diagram illustrating the configuration of one example of the television camera device of the present invention. Reference numeral 100 represents the television camera device of one example of the present invention, reference numeral 110 represents a camera head of the television camera device 100, reference numeral 120 represents a viewfinder (VF), reference numeral 160 represents a CCU of the television camera device 100, and reference numeral 180 represents an optical composite cable. Here, the optical composite cable 180 is an optical composite cable for the television camera device and for coupling the camera head 110 and the CCU 160, carrying out communication between the camera head 110 and the CCU 160, and carrying out the transmission and/or reception of a video signal (including an audio signal), making an income call, supplying electric power to the camera head, and so on. Moreover, reference numeral 111 represents a utility power source output terminal, to which a utility power source is output, reference numeral 112 represents an SDI output terminal, to which an SDI signal is output, reference numeral 113 represents a return output terminal, to which a return video signal is output, reference numeral 114 represents a prompt output terminal, to which a prompt is output, reference numeral 115 represents a viewfinder output (VF_OUT) terminal, to which a viewfinder output video signal is output, reference numeral 116 represents a control signal input terminal, to which a camera operator inputs a control signal from an operation panel or the like in order to operate the camera head, reference numeral 161 represents an AC power source terminal, to which the electric power of AC 100 V is input, reference numeral 162 represents a control signal input terminal, to which a control signal for controlling the CCU 160 and camera head 110 is input, reference numeral 163 represents a return input terminal for inputting a return video, reference numeral 164 represents a prompt input terminal, to which a prompt video is input, reference numeral 165 represents a video output terminal, to which a video signal is output, reference numeral 166 represents a GEN-LOCK (GL: Generator Lock) signal input terminal, to which a synchronous signal is input, and reference numerals 181 and 186 represent optical composite cable connection terminals. The television camera device is a high-resolution three-plate type color camera for shooting movies, for example. The control signal input terminal 162 is connected by means of an interface, for example such as RS-485 or RS-422.

A staff inputs a control signal to the control signal input terminal 162 using an operation unit.

In FIG. 1, a case is described, where the camera head 110 is installed inside a television studio 100 and the CCU 160 is installed in a sub-control room.

In FIG. 1, inside the television studio, the camera head 110 attached with the VF 120 is installed and a camera operator operates the camera head 110 and the VF 120. Moreover, in the sub-control room, the CCU 160 corresponding to the camera head 110 is installed, and these camera head 110 and CCU 160 are coupled to each other by means of the optical composite cable 180 via the optical composite cable connection terminals 181 and 186.

The camera head 110 is shooting a desired subject inside the television studio. The camera head 110 transmits the shot video to the CCU 160 in the sub-control room via the optical composite cable 180.

The CCU 160 is installed inside the sub-control room, a staff inside the sub-control room controls the camera head 110 via the optical composite cable 180 by operating a non-illustrated operation unit of the CCU 160. The camera head 110 adjusts the image quality of a video to be shot. Moreover, the CCU 160 supplies an electric power to the camera head 110 inside the television studio via the optical composite cable 180.

For example, a staff inside the sub-control room confirms a video, which is transmitted from the camera head 110 in the television studio, with a non-illustrated monitor. Then, the staff sends an instruction for adjustment to a camera operator or the like in the television studio, via an income call or the like. Moreover, the staff transmits a return video and a prompt signal, which are to be transmitted to the display unit of the VF 120, via the CCU 160, the optical composite cable 180, and the camera head 110. Furthermore, the staff can also directly control the camera head 110 via the CCU 160 and the optical composite cable 180.

Figure 2:
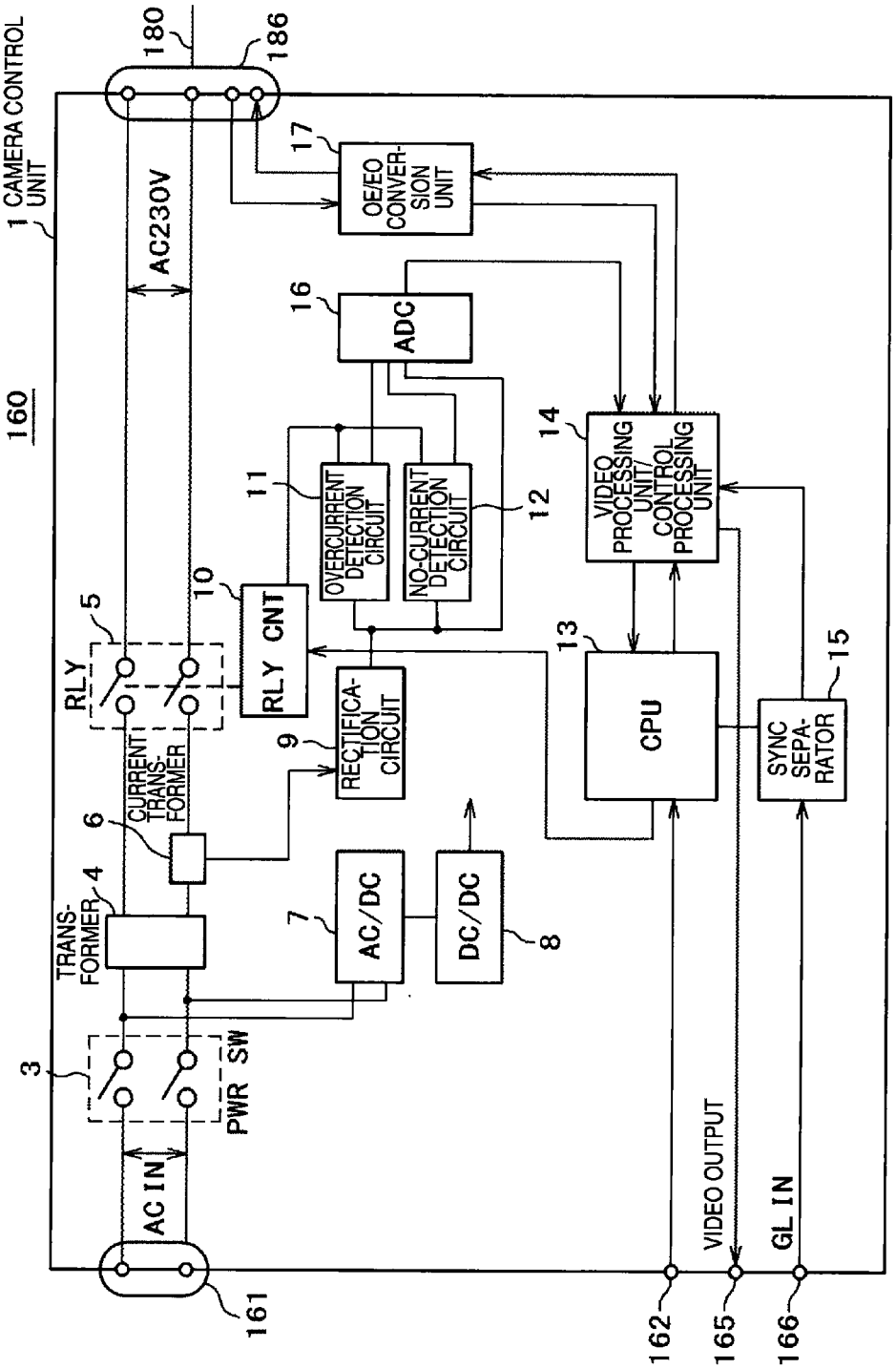
FIG. 2 is a block diagram illustrating the configuration of one example of a CCU of the television camera device of the present invention.
Figure 3:
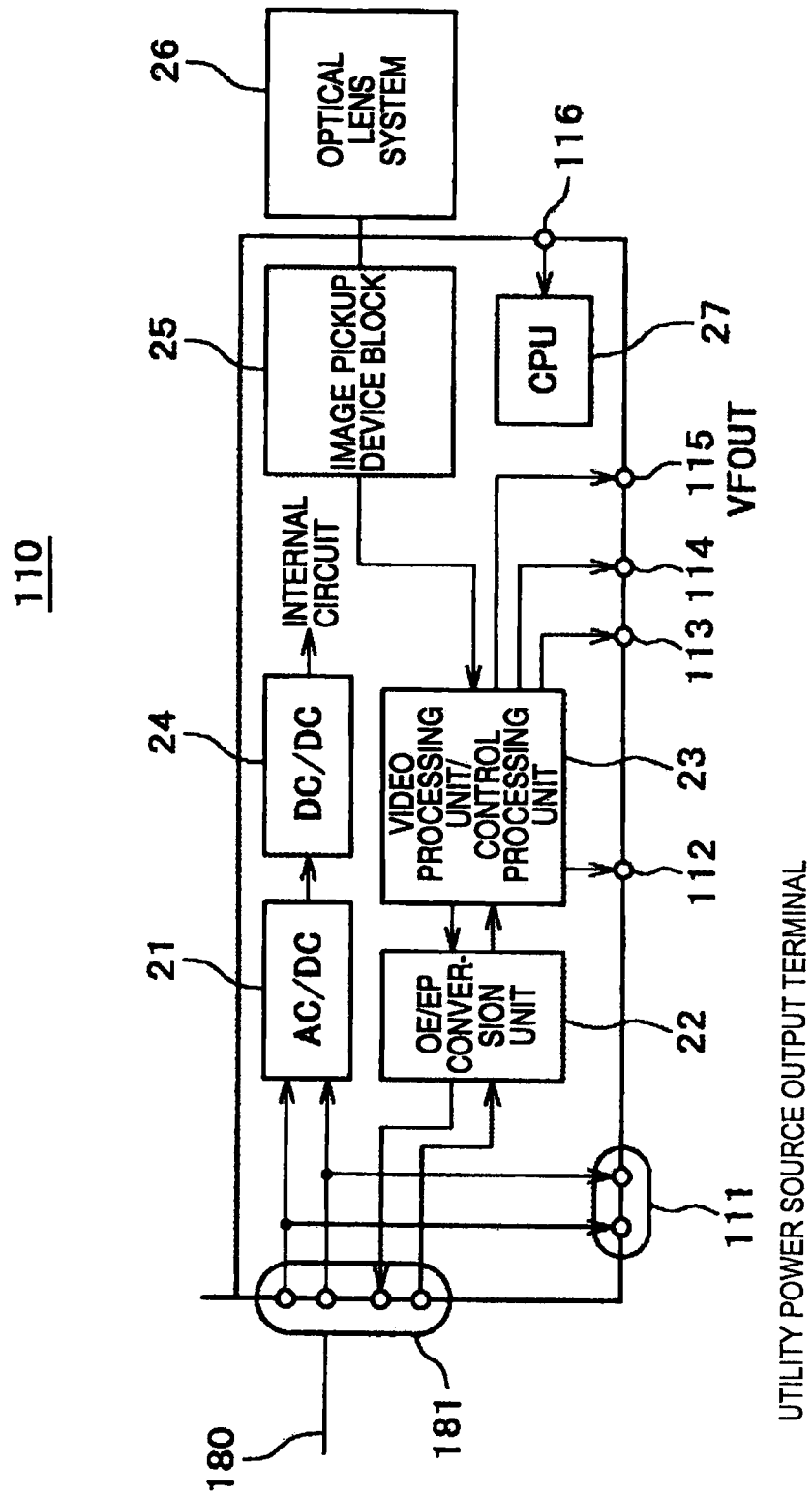
FIG. 3 is a block diagram illustrating the configuration of one example of a camera head of the television camera device of the present invention.
Figure 4:
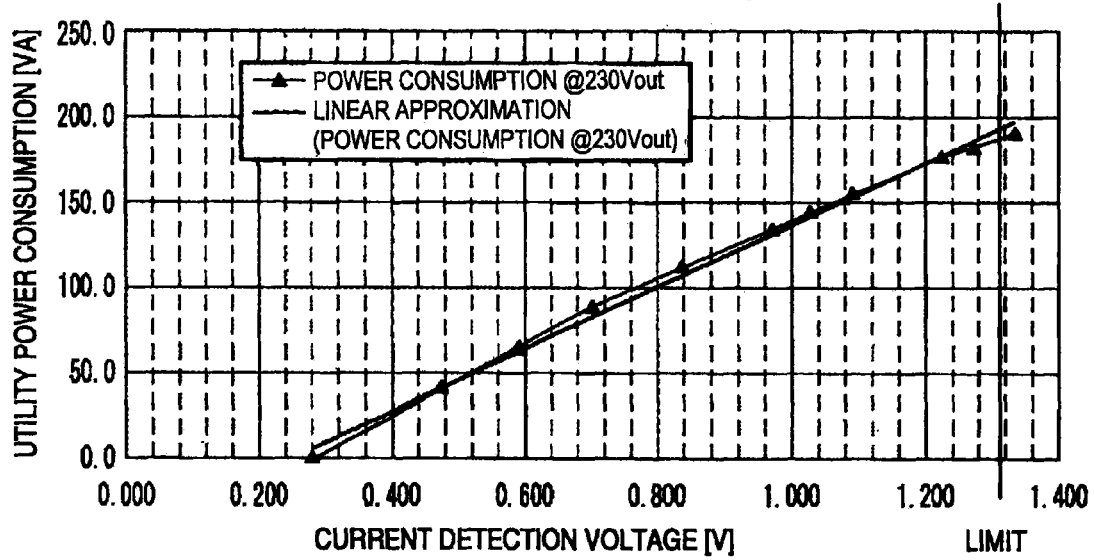
FIG. 4 illustrates the actually measured values of relationship between the power consumption of a utility power source and the detection voltages, and an approximation formula, in one example of the television camera device of the present invention.
Figure 5:
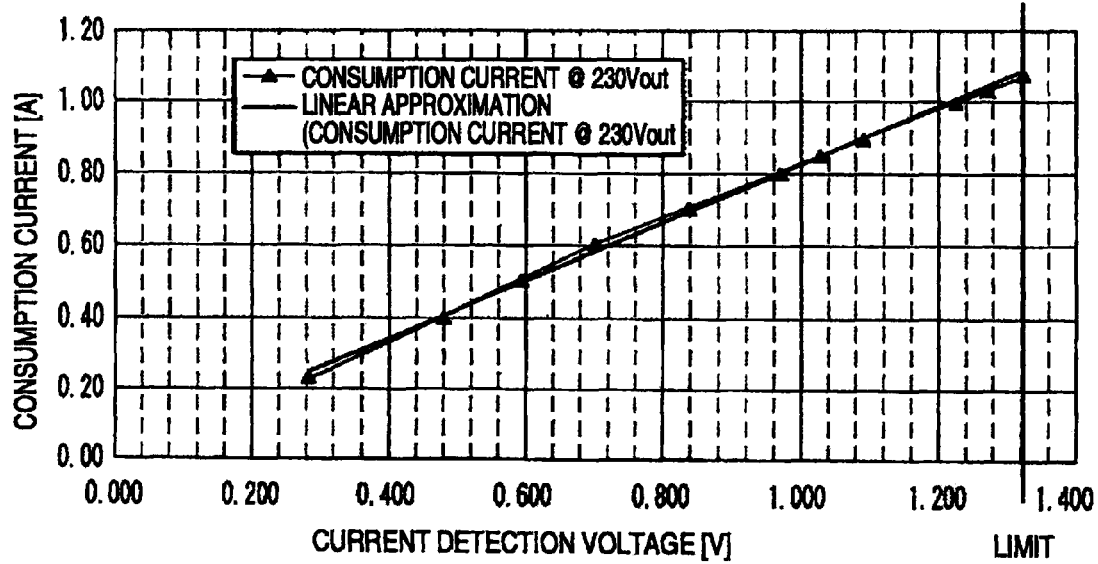
FIG. 5 illustrates the actually measured values of relationship between the consumption current of the camera head and CCU and the detection voltages and an approximation formula, in one example of the television camera device of the present invention.

Next, the television camera device of the present invention is further described using FIG. 2 and FIG. 3. FIG. 2 is a block diagram illustrating the configuration of one example of the CCU 160 of the television camera device 100 of FIG. 1. FIG. 3 is a block diagram illustrating the configuration of one example of the camera head 110 of the television camera device 100 of FIG. 1. Reference numeral 3 represents a power source switch (PWR SW), reference numeral 4 represents a transformer, reference numeral 5 represents a relay switch (RLY SW), reference numeral 6 represents a current transformer, reference numerals 7 and 24 each represent an AC/DC converter, reference numeral 8 represents a DC/DC converter, reference numeral 9 represents a rectification circuit, reference numeral 10 represents a relay controller (RLY CNT), reference numeral 11 represents an overcurrent detection circuit, reference numeral 12 represents a no-current detection circuit, reference numeral 13 represents a CPU (Central Processing Unit) that controls each device in the CCU 160, reference numerals 14 and 23 each represent an video processing unit/control processing unit, reference numeral 15 represents a sync separator that extracts a synchronous signal from the GENLOCK signal input from the GL signal input terminal 166 and outputs the same to the video processing unit/control processing unit 14, reference numeral 16 represents an ADC (Analog to Digital Converter), reference numerals 17 and 22 each represent an OE (optical to electric)/EO (electric to optical) conversion unit, reference numeral 21 represents an AC/DC converter, reference numeral 25 represents an image pickup device block, reference numeral 26 represents an optical lens system, and reference numeral 27 represents a CPU that controls each device in the camera head 110. The image pickup device block 25 employs, for example, a CCD (Charge Coupled Device) image pickup device as the image pickup device.

In FIG. 2 and FIG. 3, when the power switch 3 of the CCU 160 is turned on from turned off by the operation of a staff or the like, the power source of AC 100 V is supplied to the CCU 160 from the AC power source terminal 161. The supplied power source is supplied to the transformer 4 and the AC/DC converter 7. The AC/DC converter 7 converts the supplied AC power source to the DC power source of a predetermined voltage (e.g., 12 V), and supplies the resulting voltage to the DC/DC converter 8. The DC/DC converter 8 converts the voltage of the supplied DC power source to a predetermined voltage (e.g., 12 V, 5 V, or the like), and supplies the resulting voltage to the corresponding internal devices of the CCU 160.

Moreover, the transformer 4 converts the voltage of the supplied commercial power source of AC 100 V to AC 230 V, and outputs the resulting voltage to the relay switch 5 and the current transformer 6.

The relay switch 5 turns on or off the supplied power source of AC 230 V in accordance with the control of the relay controller 10, and during turned-on state, the relay switch 5 supplies the electric power of AC 230 V to the optical composite cable connection terminal 186. The power source supplied to the optical composite cable connection terminal 186 is supplied to the optical composite cable connection terminal 181 of the camera head 110 via the optical composite cable 180.

The current transformer 6 outputs a current, which is shunted for current measurement, to a current rectification circuit 9.

Moreover, in the camera head 110, the power source (AC 230 V) supplied to the optical composite cable connection terminal 181 from the CCU 160 is supplied to the AC/DC converter 21. The AC/DC converter 21 converts the supplied power source to the DC power source of a predetermined voltage (e.g., 12 V) and supplies the resulting voltage to the DC/DC converter 24. The DC/DC converter 24 converts the voltage of the supplied DC power source to a predetermined voltage (e.g., 12 V, 5 V, or the like), and supplies the resulting voltage to the corresponding internal device of the camera head 110 as the internal power source.

Furthermore, the power source (AC 230 V) supplied to the optical composite cable connection terminal 181 is output to the utility power source output terminal 111 as a utility power source, which a user (camera operator or the like) can freely use, apart from the power source used as the internal power source of the camera head 110.

The utility power source is often used, for example, as the power source of a device attached to the camera head 110. The examples of the power source of a device attached to the camera head 110 include the power source of a camera platform having the camera head mounted thereon and panning or tilting, the power source of a floor monitor for monitoring a return video, the power source of a prompter, and the like.

Conventionally, the customer side cannot know the usage rate of this utility power source. Accordingly, a user, such as a camera operator, cannot tell how much of the utility power source is currently being used. Then, in one example of the present invention, the data of the amount of usage of electric power of this utility power source is enabled to be output, such as to be displayed on the VF 120, so that a user, such as a camera operator, operating the camera head 110 can recognize at a glance the amount of usage of electric power of this utility power source.

Hereinafter, the example thereof is described using FIG. 2 and FIG. 3.

In the camera head 110 of FIG. 3, the image pickup device block 25 captures a subject image incident through the optical lens system 26, converts the captured image to an electric signal, and outputs the converted electric signal to an image processing unit/control signal processing unit 23 as a video signal. The image processing unit/control signal processing unit 23 performs a predetermined image processing on the input video signal and outputs the resulting video signal to the OE/EO conversion unit 22. Moreover, under the control of the CPU 27, the image processing unit/control signal processing unit 23 outputs the resulting video signal also to the viewfinder output terminal 115. The viewfinder 120 is connected to the viewfinder output terminal 115, so that a camera operator can view the captured video.

The OE/EO conversion unit 22 converts to an optical signal the video signal input from the image processing unit/control signal processing unit 23, and outputs the resulting optical signal to the CCU 160 via the optical composite cable connection terminal 181 and the optical composite cable 180.

In the CCU 160, the optical composite cable connection terminal 186 receives the video signal sent from the camera head 110, and outputs the same to the OE/EO conversion unit 17. The OE/EO conversion unit 17 converts to an optical signal the video signal input from the optical composite cable connection terminal 186, and outputs the resulting optical signal to the image processing unit/control signal processing unit 14. The image processing unit/control signal processing unit 14 performs a predetermined image processing on the input video signal, and outputs the resulting video signal to the video output terminal 165. A monitor is connected to the video output terminal 165, so that the output video can be viewed.

Moreover, in the CCU 160, the image processing unit/control signal processing unit 14 outputs a video signal, such as a video which another television camera device captured, input from the outside (not illustrated) or the video signal of a video, which the camera head 110 captured and on which the image processing unit/control signal processing unit 14 performed the image processing, to the camera head 110 via the OE/EO conversion unit 17, the optical composite cable connection terminal 186, and the optical composite cable 180.

In the camera head 110, the image processing unit/control signal processing unit 23 performs image processing on the above-described video signal, which is sent via the optical composite cable connection terminal 181 and the OE/EO conversion unit 22 from the CCU 160, and outputs the resulting video signal to the return output terminal 113. To the return output terminal 113 is connected, for example, a floor monitor, where a return video is displayed.

Similarly, a prompt signal output from the CCU 160 is output to the prompt output terminal 114 from the image processing unit/control signal processing unit 23 of the camera head 110. To the prompt output terminal 114 is connected a prompter, where a prompt from the prompt output terminal 114 is displayed.

In the CCU 160 of FIG. 2, the output current of the transformer 4 is shunted using the current transformer 6, and the current rectification circuit 9 rectifies the input voltage and outputs a value of the rectified voltage to the overcurrent detection circuit 11 and the no-current detection circuit 12. The overcurrent detection circuit 11, if the input rectified-voltage is equal to or greater than a predetermined voltage, determines as overcurrent (shorting of a cable), and outputs a turn-off signal to the relay controller 10. Moreover, the no-current detection circuit 12, if the input rectified-voltage is less than a predetermined voltage, determines as "no current" (opening of a cable), and outputs a turn-off signal to the relay controller 10.

When the turn-off signal is input from at least either of the overcurrent detection circuit 11 or the no-current detection circuit 12, the relay controller 10 turns off (cuts off) the relay switch 5 to protect the power source.

As described above, in the present invention, a current being supplied to the camera head 110 is monitored, and if this current is equal to or greater than a predetermined voltage, it is determined as overcurrent (shorting of a cable), while if this current is less than a predetermined voltage, it is determined as "no current" (opening of a cable), thereby protecting the power source.

The rectification circuit 9 outputs this voltage value also to the ADC 16. Similarly, the overcurrent detection circuit 11 outputs the result of determination of whether or not the current being supplied to the camera head 110 is a overcurrent also to the ADC 16, and the no-current detection circuit 12 outputs the result of determination of whether or not this current is "zero" also to the ADC 16.

The ADC 16 converts the input voltage value and the determination result thereof to a digital value and outputs this digital value to the video processing unit/control processing unit 14. The video processing unit/control processing unit 14 outputs this digital value to the CPU 13.

For example, using the value read by the ADC 16, display data of each of the current power consumption of the camera head 110 and CCU 160 and the current amount of usage of electric power of the utility power source is output as a video output.

For example, when the detection voltage is X [unit: V], the amount of usage of electric power of the utility power source Y [unit: VA] is expressed as Formula (1) below from the actually measured results (see FIG. 4 and FIG. 5).

$$Y = 89.681X - 45.406 \quad \text{Formula (1)}$$

The current usage value when the maximum available value is set to 191 VA is displayed on a screen. (FIGS. 1 and 3)

The CPU 13 determines whether or not the voltage value input from the video processing unit/control processing unit 14 is an error (overcurrent or no current), and if it is an error, the CPU 13 controls the video processing unit/control processing unit 14 to display the error via the video output terminal 165. Moreover, preferably, even when it is not an error, the CPU 13 controls the video processing unit/control processing unit 14 to display this fact via the video output terminal 165.

Furthermore, the CPU 13 controls the video processing unit/control processing unit 14 to output the display data about the amount of usage of electric power of the utility power source to the OE/EO conversion unit 17 from the camera head 110.

The OE/EO conversion unit 17 converts the input display data to an optical signal and outputs this optical signal to the optical composite cable connection terminal 181 of the camera head 110 via the optical composite cable connection terminal 186 and the optical composite cable 180.

The optical composite cable connection terminal 181 of the camera head 110 outputs the input display data to the OE/EO conversion unit 22. The OE/EO conversion unit 22 converts the input display data to an electric signal and outputs this electric signal to the video processing unit/control processing unit 23.

The video processing unit/control processing unit 23 outputs the input display data to the viewfinder output terminal 115. As a result, the data about the amount of usage of electric power of the utility power source is displayed on the viewfinder 120 connected to the viewfinder output terminal 115.

Figure 6:
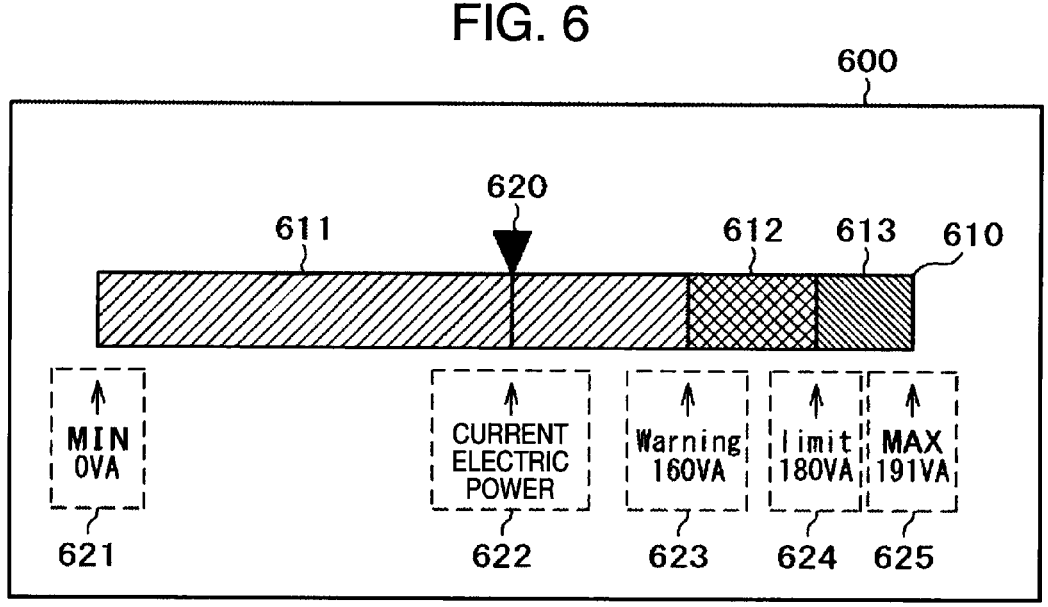
FIG. 6 illustrates one example of the data about the amount of usage of electric power of the utility power source displayed on the display screen of a viewfinder 120, in one example of the television camera device of the present invention.

FIG. 6 illustrates one example of the data about the amount of usage of electric power of the utility power source displayed on the display screen of the viewfinder 120.

In a display 600 displayed on the display screen of the viewfinder 120, a bar graph 610 indicative of the whole available electric power, the bar graph 610 comprising an allowable region 611 indicative of a predetermined allowable power range, a warning region 612 indicative of a predetermined warning power range, and a limiting area 613 indicative of a predetermined limiting power range, is first displayed. In the bar graph 610, there are displayed a text display 621 of the smallest power value, a text display 622 of the current electric power, an indicator graphic 620 indicative of the position of the current electric power, a text display 623 indicating that an electric power value equal to or greater than this point is in the warning power range, a text display 624 indicating that an electric power value equal to or greater than this point is in the limiting power range, and a text display 625 indicative of the maximum power value.

Figure 7:
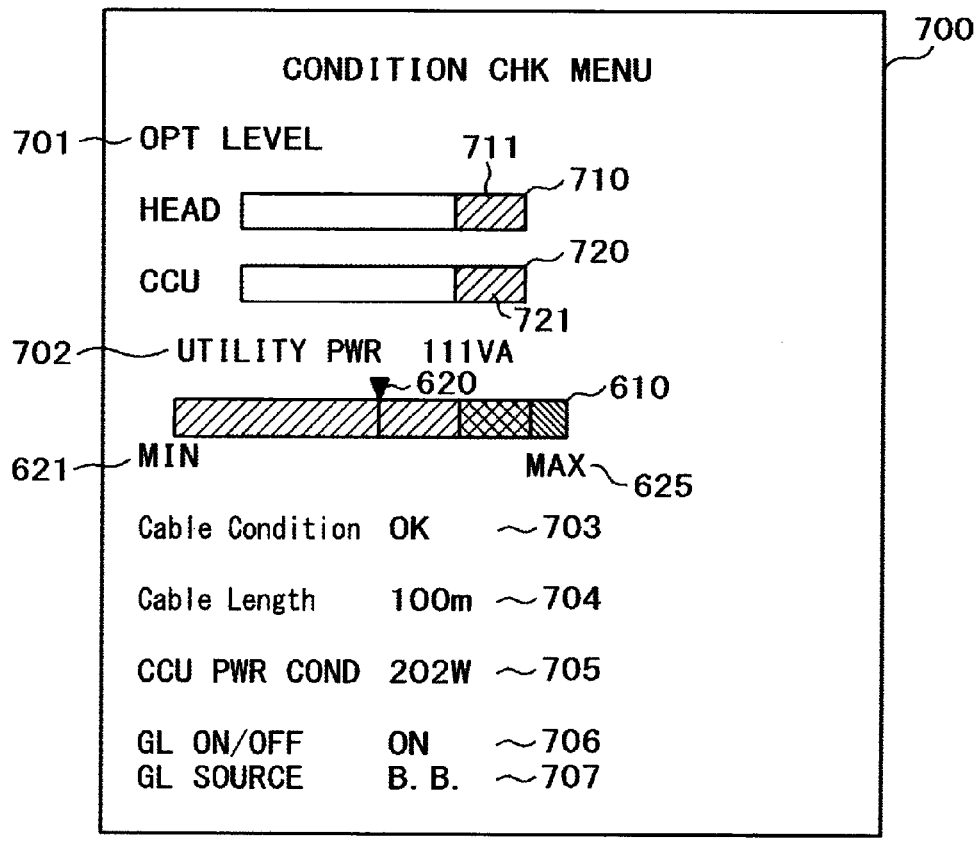
FIG. 7 illustrates one example of the data about the amount of usage of electric power of the utility power source displayed on the display screen of a viewfinder 120, in one example of the television camera device of the present invention.

FIG. 7 illustrates one example of the data about the amount of usage of electric power of the utility power source displayed on the display screen of the viewfinder 120.

In the display 700 displayed on the display screen of the viewfinder 120, the current power value of the utility power source is displayed as "111 VA", as a display 702 of "UTILITY PWR", as illustrated in the display 600 of FIG. 6. Moreover, other than this, the followings are displayed.

First, in a display 701 of "OPT LEVEL", the reception level of each of the camera head 110 and the CCU 160 is displayed.

For example, the reception level of the camera head 110 is illustrated as a bar graph 710, and the reception level of the CCU 160 is illustrated as a bar graph 720. Here, in the bar graphs 710 and 720, the whole bar corresponds to the maximum reception level, cross-hatched regions 711 and 721 each indicate the reception level.

Figure 8:
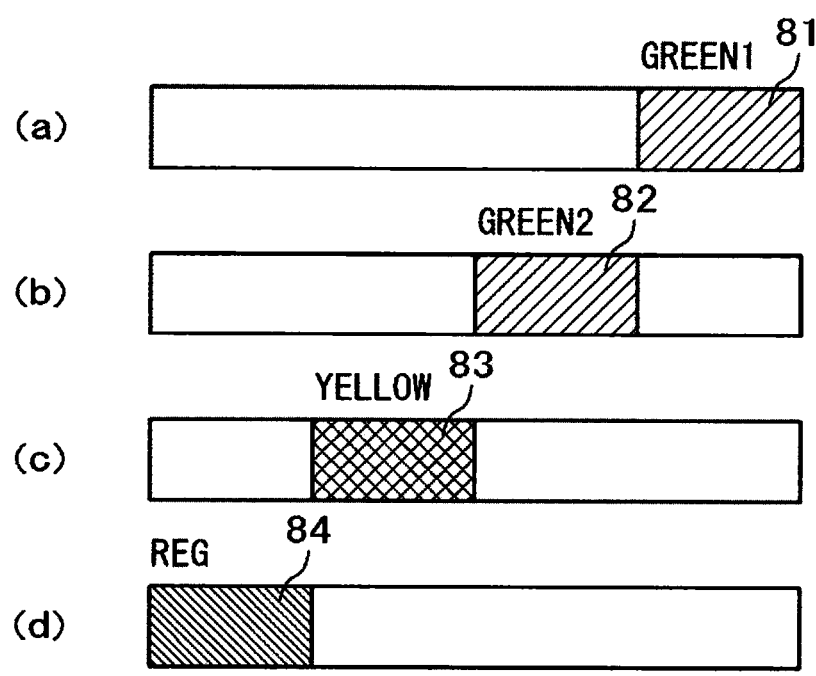
FIG. 8 is a view for illustrating display colors in the display example of FIG. 7.

The display colors of the reception levels 711 and 721 are, for example as illustrated in FIG. 8, displayed as follows: (a) a reception level R indicates $-3 \text{ dBm} \geq R > -8$ dBm (the fill color of a region 81 is green indicative of safety), (b) the reception level indicates $-8 \text{ dBm} \geq R > -11$ dBm (the fill color of a region 82 is green indicative of safety), (c) the reception level indicates −11 dBm≥R>−14 dBm (the fill color of a region 83 is yellow indicative of warning), and (d) the reception level indicates −14 dBm≥R (the fill color of a region 84 is red indicative of danger).

Next, a display 703 of "Cable Condition OK" is displayed. Here, if the optical composite cable 180 is determined as being connected, then "OK" is displayed, if determined as being open, then "OPEN" is displayed, and if determined as being shorted, then "SHORT" is displayed.

Moreover, a display 704 of "Cable Length 100 m" is displayed. For the calculation of this length, data for measurement is input to the user area of a transmission packet and this packed is transmitted and received, thereby calculating the length. The calculated length is displayed, for example, in meter as "100 m" or "50 m" for example.

Moreover, a display 705 of "CCU PWR COND" is displayed. The display 705 indicates all the electric power which the CCU 160 is using as a total. For example, a total (56 W+35 W+111 W=202 W) of 56 W consumed by the CCU 160, 35 W consumed by the camera head 110, and 111 VA (111 W for convenience in this example) of the display 702 of "UTILITY PWR" described above is displayed.

Moreover, a display 706 of "GL ON/OFF" is displayed. The display 706 indicates whether GEN LOCK is in an on-state or an off-state, and in the case of the on-state, "ON" is displayed, while in the case of the off-state, "OFF" is displayed. Moreover, a display 707 of "GL SOURCE B.B." is displayed. The display 707 indicates what the source of the GENLOCK (GL) signal is based on, and in the case of from B.B. (Black Burst), "B.B." is displayed, in the case of from Tri-Sync, "Tri-Sync" is displayed, or in the case where an external synchronous signal is not input or the GENLOCK (GL) signal is not synchronized, "None" is displayed.

As described above, with the television camera device of the first embodiment of the present invention, a user can visually check the margin of the used power of a utility device, and therefore can easily determine the same.

Second Embodiment

Furthermore, a second embodiment of the present invention is described with reference to FIG. 1 to FIG. 5. The second embodiment of the present invention, in addition to the first embodiment, is capable of controlling so that the level of priority is assigned to a device using the utility power source, the amount of usage of electric power of the utility power source is monitored, and the electric power supplied to a device or the function of the device is restricted in accordance with the amount of usage of electric power. That is, in order to effectively use a utility electric power, a device to be connected is controlled and the function of the device to be connected is restricted. As a result, electric power to be used can be limited in accordance with the remaining amount or used amount of the utility electric power.

In the second embodiment, as the order of priority, the first priority is assigned to a camera platform, and the second priority is assigned to the return output and the prompter output.

As with the first embodiment, the CCU 160 monitors the current supplied to the camera head 110. For example, the CPU 13 detects, based on a digital value input from the video processing unit/control processing unit 14, the current power consumption of the camera head 110 and CCU 160, and the current amount of usage of electric power of the utility power source.

Then, when the used power of the utility power source exceeds a predetermined value (e.g., the used power is in the limiting power range or in the warning power range), the CPU 13, in order to preferentially supply the electric power to be supplied to the camera platform, controls the video processing unit/control processing unit 23 to set the brightness level of a video output to the return output terminal 113 and the brightness level of a prompter output to the prompt output terminal 114 to the minimum level, respectively.

For example, the CPU 13 superimposes the above-described control signal on a BB (Black Burst) signal, and outputs the resulting signal from the video processing unit/control processing unit 14, and outputs the same to the CPU 27 via the OE/EO conversion unit 17, the optical composite cable connection terminal 186, the optical composite cable 180, the optical composite cable connection terminal 181, and the OE/EO conversion unit 22. The CPU 27 controls, based on the input control signal, the video processing unit/control processing unit 23 to set the brightness level of a video, which is output from the video processing unit/control processing unit 23 and output to the return output terminal 113, and the brightness level of a prompter output to the prompt output terminal 114 to the minimum level, respectively.

According to the second embodiment, the television camera device detects the current amount of usage of electric power of the utility power source, and when the used power is in the limiting power range or in the warning power range, the television camera device automatically lowers the brightness level of a video signal output to a device (e.g., the floor monitor connected to the return output terminal 113 and/or the prompter connected to the prompt output terminal 114) with a lower priority.

As a result, the used power of the floor monitor or the prompter is suppressed and the used power decreases, and therefore a total amount of usage of electric power of the utility power source can be suppressed, so that the utility power source will never be disconnected due to over power. Accordingly, the television camera device can be efficiently used without stopping the function of a device (e.g., camera platform) minimally required for operation (with a higher priority) of the television camera device.

Note that, the automatically controlled content may be displayed in text in the VF 120.

Note that, in the first embodiment or the second embodiment, preferably, the CPU 13 may output, to the video processing unit/control processing unit 23 or the CPU 27 of the camera head 110, a control signal to output audio and thereby cause to output a warning in voice from the camera head 110. As a result, in addition to the effect of the first embodiment or the second embodiment, a camera operator can know also by voice (auditory sense) that the remaining available electric power is low and thus the television camera device can be efficiently operated without stopping the function of a device minimally required for operation of the television camera device.

Note that, in the above-described first embodiment and second embodiment, the CCU and the camera head are connected to each other with an optical composite cable, but a multicore coaxial cable capable of signal transmission of time division multiplex or the like and of supplying electric power may be used in place of the optical composite cable and the OE/EO conversion unit.

INDUSTRIAL APPLICABILITY

The present invention can be used not only for the television camera device that uses an optical composite cable and multicore coaxial cable for transmission as the digital video signal multiplex transmission method, but also used for the method for displaying the state of the used power of a device that uses a cable capable of transmitting a wide range of signals and of supplying electric power.

REFERENCE SIGNS LIST

3: power source switch (PWR SW)
4: transformer
5: relay switch (RLY SW)
6: current transformer
7, 21: AC/DC converter
8, 24: DC/DC converter
9: rectification circuit
10: relay controller (RLY_CONT)
11: overcurrent detection circuit
12: no-current detection circuit
13, 27: CPU (central processing unit)
14, 23: video processing unit/control processing unit
15: sync separator
16: ADC (analog to digital converter)
17, 22: OE (optical to electric)/EO (electric to optical) conversion unit
25: image pickup device block
26: optical lens system
100: television camera device
110: camera head
111: utility power source output terminal
112: SDI output terminal
113: return output terminal
114: prompt output terminal
115: viewfinder output (VF_OUT) terminal
116: control signal input terminal
120: viewfinder (VF)
160: CCU
161: AC power source terminal
162: control signal input terminal
163: return input terminal
164: prompt input terminal
165: video output terminal
166: GL signal input terminal
180: optical composite cable
181, 186: optical composite cable connection terminal
600: display
610, 611, 612, 613: region
621, 622, 623, 624, 625: text display

The invention claimed is:

1. A television camera device comprising:
a camera head;
a camera control unit configured to control the camera head; and
a cable connecting the camera control unit and the camera head, wherein
the camera head includes a unit configured to output a utility power source, a return video output unit, and a prompt output unit, wherein
the camera control unit includes a detection unit configured to detect an electric power used by the television camera device, and wherein
the camera head includes an output unit configured to display an electric power detected by the detection unit and an electric power which the utility power source can output, and wherein
an order of priority is assigned to a device to which the utility power source is output, wherein
the camera control unit compares a value detected by the detection unit with a predetermined value, and wherein
when the detected value is equal to or greater than the predetermined value, the camera control unit restricts, based on the order of priority, a function of the device that uses an output of the utility power source of the camera head.

2. The television camera device according to claim 1, wherein the camera control unit displays an amount of usage of electric power of the utility power source of the camera head by using a value detected by the detection unit.

* * * * *